May 20, 1952 — G. E. DATH ET AL — 2,597,709
LEVER MECHANISM FOR CLUTCHES
Filed Sept. 9, 1950 — 3 Sheets-Sheet 1

Inventors:
George E. Dath.
Harry W. Mulcahy.
By Henry Fuchs
Atty.

May 20, 1952   G. E. DATH ET AL   2,597,709
LEVER MECHANISM FOR CLUTCHES
Filed Sept. 9, 1950   3 Sheets-Sheet 3

Inventors:
George E. Dath.
Harry W. Mulcahy.
By Henry Fuchs
Atty.

Patented May 20, 1952

2,597,709

UNITED STATES PATENT OFFICE 2,597,709

LEVER MECHANISM FOR CLUTCHES

George E. Dath, Mokena, and Harry W. Mulcahy, Chicago, Ill., assignors to W. H. Miner, Inc., Chicago, Ill., a corporation of Delaware Application September 9, 1950, Serial No. 183,978

3 Claims. (Cl. 74—98)

This invention relates to improvements in clutch shifting or actuating means.

One object of the invention is to provide simple and efficient means, in the form of a lever actuated mechanism for shifting the sliding clutch member of a clutch mechanism to engaged and disengaged positions.

A more specific object of the invention is to provide a hand operated lever mechanism, especially designed for shifting the sliding clutch element or member of a worm gear operated hand brake mechanism in one direction to disengaged position to effect quick release of the brakes and in a reverse direction to operatively engaged position Other objects of the invention will more clearly appear from the description and claims hereinafter following.

Figure 1:
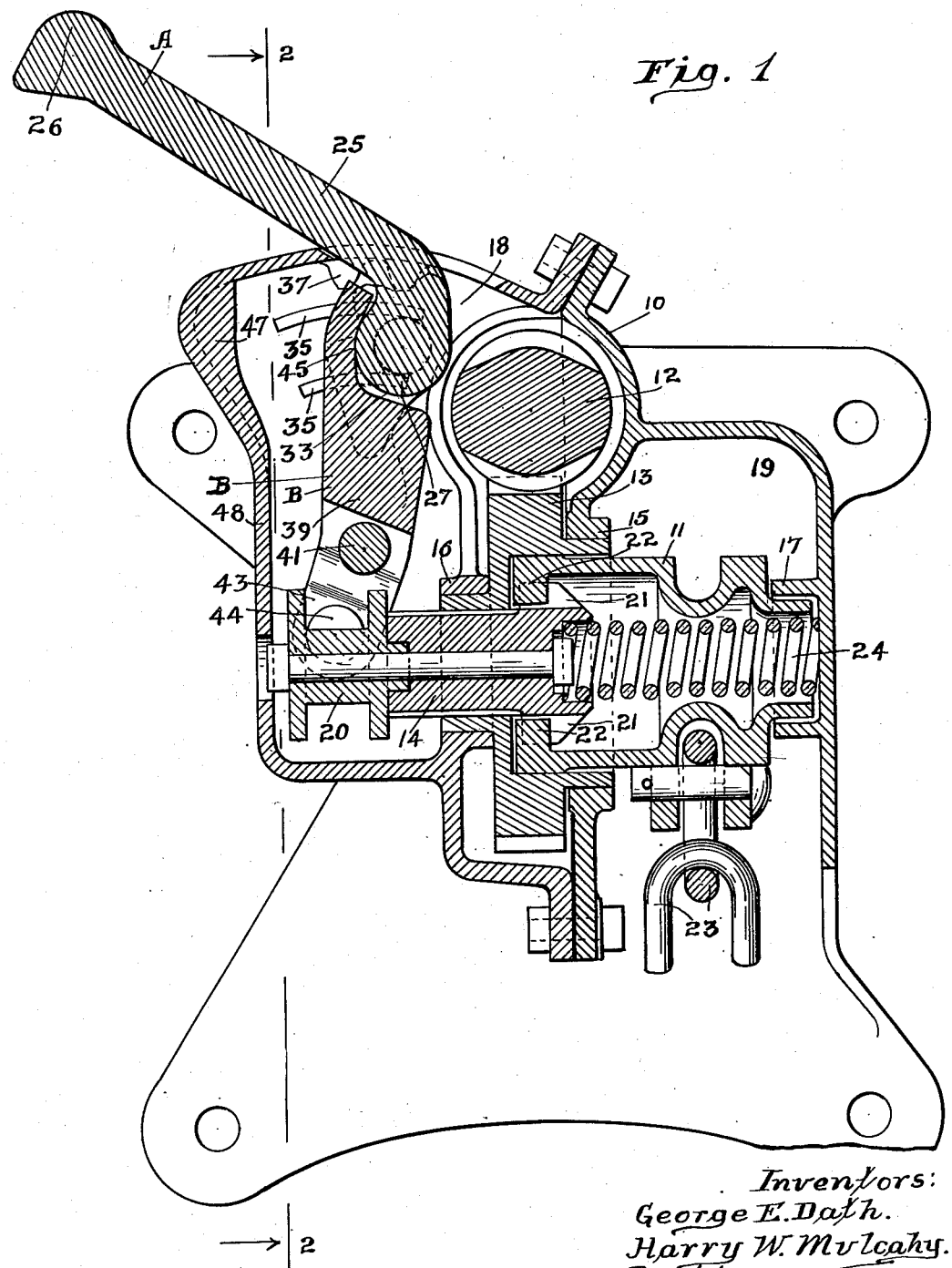
Figure 2:
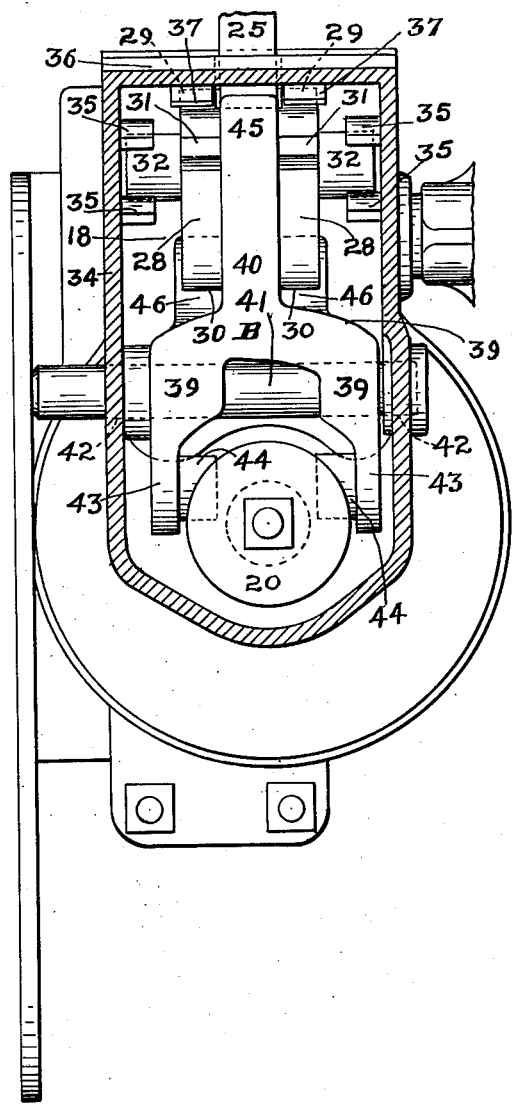
Figure 3:
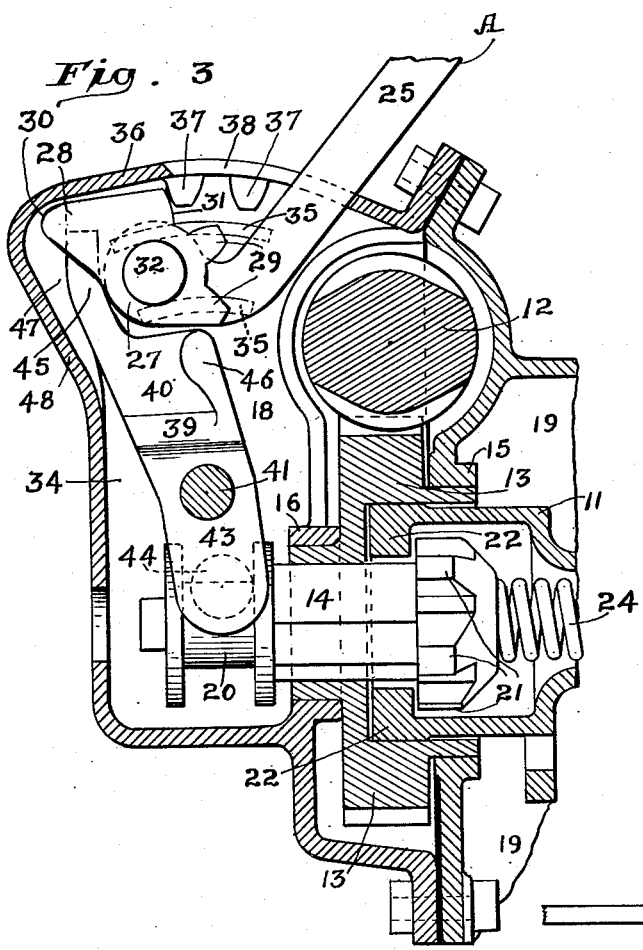
Figure 6:
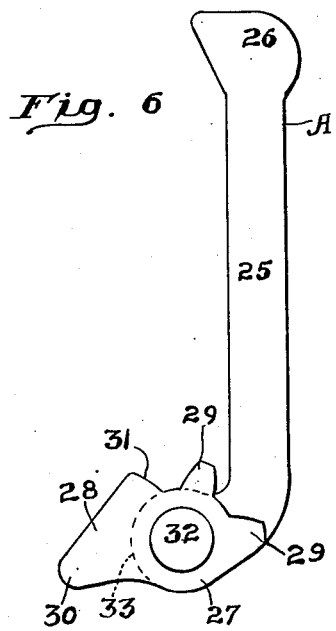
Figure 5:
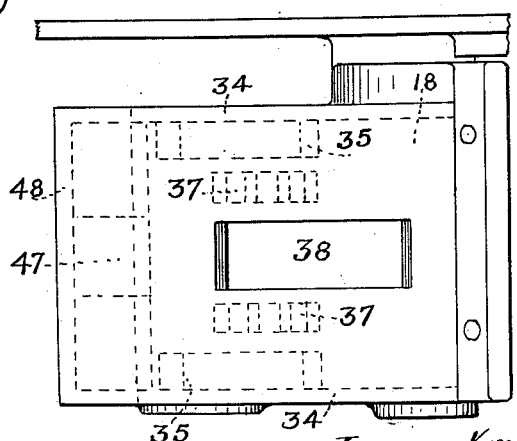
Figure 4:
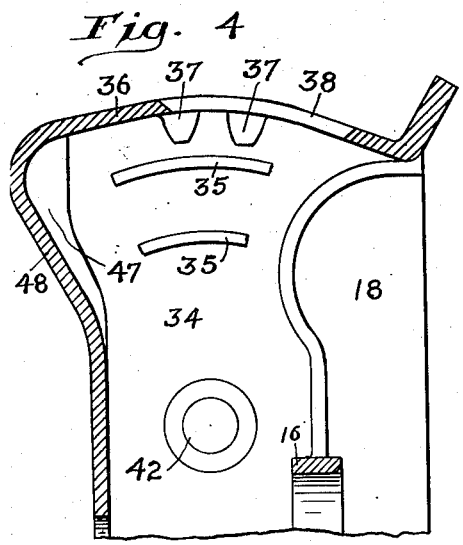

In the accompanying drawings forming a part of this specification, Figure 1 is a transverse, vertical sectional view of a power multiplying, worm gear driven hand brake mechanism, illustrating our improved clutch shifting lever mechanism in connection therewith. Figure 2 is a vertical sectional view, corresponding substantially to the line 2—2 of Figure 1. Figure 3 is a view similar to Figure 1, partly broken away, showing the parts in different positions, and illustrating the clutch member and clutch shifting lever mechanism in elevation. Figure 4 is a broken view similar to Figure 3, showing a portion of the brake housing only. Figure 5 is a top plan view of Figure 4. Figure 6 is a side elevational view of the hand operated lever of our improved mechanism.

The power multiplying hand brake mechanism proper, illustrated in the drawings, is of well-known construction and comprises a housing 10, within which the parts of the brake mechanism are contained, a chain winding drum 11, a worm element 12 driven by the usual hand wheel, not shown, a worm wheel 13 with which the worm 12 meshes, and a sliding clutch member 14 operatively connecting the worm wheel and drum. The worm wheel 13 is rotatably supported by bearing members 15 and 16 provided in the housing 10, being rotatably supported about an axis at right angles to the axis of rotation of the worm element 12. As shown in Figure 1, the chain winding drum 11 is in axial alignment with the worm wheel 13 and has its opposite ends rotatably supported in said worm wheel and a bearing 17 on the housing 10. The clutch member 14 is slidingly mounted within the worm wheel 13 and splined to the same for rotation in unison therewith. The housing, as shown in Figure 1, is divided into left and right chambers 18 and 19, the drum 11 and the worm wheel 13 being mounted within the chamber 19 and the clutch member 14 projecting into the chamber 18. As shown, the clutch member 14 is provided at its outer end, with a fixed spool portion 20 and has teeth 21 at its inner end cooperating with internal teeth 22 on the drum 11. The drum 11 has the usual chain 23 windable thereon, the chain 23, as is well understood, leading to the brake mechanism proper of the railway car. Figure 1 shows the clutch member 14 operatively engaged with the drum, and Figure 3 shows the same shifted to the right to its disengaged position. The spring 24 mounted within the drum 11, which is hollow, serves to urge the clutch member 14 in a direction outwardly of the drum to engage the teeth thereof with the teeth of the drum.

Our improved lever mechanism for shifting the clutch member 14 comprises broadly a handle lever A and a cooperating shifting lever B.

The handle lever A is located at the top portion of the chamber 18 of the housing 10 above the sliding clutch member 14. As shown clearly in Figures 1, 2, 3, and 6, the handle lever A includes an elongated arm 25 having a hand grip knob 26 at its upper end, and a head 27 at its lower end. The head 27 comprises sector-shaped wings 28—28 at opposite sides of the arm 25, each wing being provided with two radial teeth 29—29 at one side, and a finger 30 at the opposite side thereof. The sector-shaped wings form, in effect, pinions or gears having interrupted teeth. Each finger 30 has a stop shoulder 31 at its inner end just beyond the last tooth 29 of the corresponding wing, said shoulder forming, in effect, the side portion of a third tooth. Projecting laterally outwardly from each wing 28 is a trunnion 32, the trunnions 32—32, which are at opposite sides of the head 27, being in axial alignment with each other. The head 27 presents a rounded bearing surface 33 at the top and left sides thereof, as seen in Figure 6. The vertical side walls of the chamber 18 of the housing, which side walls are indicated by 34—34, are provided with arc-shaped, upper and lower guide flanges 35—35 on the inner sides at the top portion of said chamber, defining guideways within which the trunnions 32—32 of the lever A are engaged and guided for rolling movement. The top wall of the chamber 18 of the housing, which wall is indicated by 36, is provided with a rack on its underneath side having a pair of spaced teeth 37—37 with which the teeth 29—29 of the head 27 of the lever A mesh. The arm 25 of the lever A extends upwardly through an opening 38 in the top wall 36 of the chamber 18 of the housing, the opening 38 being of sufficient length to permit the required swinging movement of the lever A to properly actuate the shifting lever B to shift the clutch member 14 to engaged and disengaged positions.

The shifting lever B has a forked head 39 at its lower end and an arm 40 upstanding from said head. The lever B is pivotally supported between its ends on a pin 41 extending through the upper end portion of the head 39 and openings 42—42 in the side walls 34—34 of the housing chamber 18. The forked head 39 comprises a pair of laterally spaced fingers 43—43, having inwardly projecting trunnions 44—44 at the bottom ends thereof, engaged with the spool portion 20 of the clutch member 14. The upper extremity of the arm 40 of the lever B is cut away to provide a tongue 45 adapted to bear against the rounded surface 33 of the head 27 of the lever A. Immediately below the cut out portion thereof, the arm 40 has vertically extending, laterally projecting ribs at opposite sides forming lugs 46—46 in the path of movement of, and adapted to be engaged by, the fingers 30—30 of the lever A.

The operation of our improved clutch shifting lever mechanism is as follows: Assuming that the parts are in the positions shown in Figure 1, that is, with the clutch teeth of the clutch member 14 in driving engagement with the clutch teeth of the drum 11, disengagement of the clutch member and release of the brakes is effected by swinging the lever A toward the right from the position shown in Figure 1 to that shown in Figure 3. During this swinging movement of the lever A, the teeth 29—29 thereof travel on the rack teeth 37—37, thereby forcing the head 27 of the lever A to the left and thus, by engagement with the tongue 45, pushing the upper end of the arm 40 of the lever B toward the left, thus swinging the lower end of the latter toward the right and sliding the clutch member 14 to the disengaged position shown in Figure 3. Movement of the lever A in this direction is positively limited by engagement with a web 47 formed on the outer wall 48 of the chamber 18 of the housing 10. At the same time, movement of the lever A is arrested by engagement of the stop shoulders 31—31 of said lever with the tooth 37 at the left hand end of the rack, as seen in Figure 3. To effect reengagement of the clutch member 14, it is shifted back to the position shown in Figure 1 upon reverse movement of the lever A, such reverse movement bringing the fingers 30—30 of the lever A into operative engagement with the lugs 46—46 of the lever B to swing the lower end of the latter to the left, as shown in Figure 1. This reverse movement of the clutch member 14 is aided by the spring 24, which presses the same toward the left, as viewed in Figure 1.

We claim:

1. In a lever mechanism, the combination with a lever pivoted between its ends; of a fixed supporting bearing member; a second lever having a head at one end and a finger on said head engageable with one end of said first named lever, said second named lever being swingingly supported at said head end by fulcrum means formed integral therewith, said fulcrum means having bodily traveling movement on said fixed bearing member; and means on said head engageable with fixed means for effecting reciprocating movement of said head through oscillatory movement of said second named lever.

2. In a lever mechanism, the combination with a lever pivoted between its ends; an upstanding tongue on the upper end of said lever at one side thereof; a lug on said upper end of the lever at the side thereof opposite to said tongue; a second lever having a head at one end engaged with the inner side of said tongue of said first named lever, a finger on said head engageable with said lug of said first named lever, said second named lever being swingingly supported at said head end by fulcrum means formed integral therewith, said fulcrum means having bodily traveling movement on a fixed bearing member; and means on said head engageable with fixed means for effecting reciprocating movement of said head through oscillatory movement of said second named lever.

3. In a lever mechanism, the combination with an upstanding lever pivoted between its ends; of an upstanding tongue on the upper end of said lever at one side thereof; a laterally projecting lug on said lever above the pivot thereof, said lug being below said tongue; a fixed guideway adjacent said lever, said guideway being at the upper end of said lever; a second lever having a head at its lower end, said head having a trunnion thereon rotatably and slidingly supported in said guideway, said head being engaged with said tongue of the first named lever to rock the latter in one direction; sector-shaped gear means on the head of said second named lever; fixed rack means with which said gear means meshes; and a finger on said head engageable with the lug of said first named lever to rock the same in a reverse direction.

GEORGE E. DATH.
HARRY W. MULCAHY.

REFERENCES CITED

The following references are of record in the file of this patent:

UNITED STATES PATENTS

| Number | Name | Date |
|---|---|---|
| 433,978 | Corning et al. | Aug. 12, 1890 |
| 1,534,274 | Krump | Apr. 21, 1925 |
| 1,988,590 | Geiger | Jan. 22, 1935 |